United States Patent [19]
Tavares et al.

[11] Patent Number: 5,307,487
[45] Date of Patent: Apr. 26, 1994

[54] METHOD OF DATABASE SYNCHRONIZATION WITH CONSISTENCY DETERMINED BY ENTRY AND EXIT COUNTERS USED ON BOTH UPDATE AND RETRIEVAL

[75] Inventors: Carlos M. Tavares, Somerset; Durval M. Tavares, Dighton, both of Mass.; Donald R. Caron, Bristol; John B. Bagley, Portsmouth, both of R.I.

[73] Assignee: The United States of America as represented by the Secretary of the Navy, Washington, D.C.

[21] Appl. No.: 770,208

[22] Filed: Oct. 3, 1991

[51] Int. Cl.[5] .................................... G06F 15/40
[52] U.S. Cl. ........................ 395/650; 395/600; 364/DIG. 1; 364/246.6; 364/242.91; 364/280; 364/281.6; 364/285; 364/286.4
[58] Field of Search .................. 395/650, 600

[56] References Cited

U.S. PATENT DOCUMENTS

| | | |
|---|---|---|
| 4,320,451 | 3/1982 | Bachman et al. .................. 395/650 |
| 4,591,976 | 5/1986 | Webber et al. . |
| 4,847,754 | 7/1989 | Obermarck et al. ................ 395/650 |
| 4,928,222 | 5/1990 | Vriezen et al. ..................... 395/650 |
| 5,119,490 | 6/1992 | Kurose ............................... 395/600 |

Primary Examiner—Thomas C. Lee
Assistant Examiner—Wayne Amsbury
Attorney, Agent, or Firm—Michael J. McGowan; Prithvi C. Lall; Michael F. Oglo

[57] ABSTRACT

A system for updating and reading a data base utilizes a pair of counters where one counter is incremented prior to an update and the other is incremented following an update. The system permits the updating to take place at any time. By keeping track of the value of the counters the system either inhibits the reading from taking place during the updating if the updating commenced prior to the commencement of the reading or provides information that an updating occurred during the reading if the reading commenced prior to the commencement of the updating. The counters and data base are located within the RAM of a computer. The system has a first application program that gives information to a second application program via these RAM based components.

3 Claims, 2 Drawing Sheets

METHOD OF DATABASE SYNCHRONIZATION WITH CONSISTENCY DETERMINED BY ENTRY AND EXIT COUNTERS USED ON BOTH UPDATE AND RETRIEVAL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to the reading and writing of data in a processing system. More particularly it concerns the accessibility of the data to both the read and write portions of the system and the providing of update notification information to the read portions of the system whenever the data is being updated by the write portion of the system.

(2) Description of the Prior Art

In prior art systems, submarine combat system processes synchronize their access to shared resources by invoking synchronization primitives. These primitives are often termed "P" and "V", or "Signal" and "Wait", or "Lock" and "Unlock." When P and V, and Signal and Wait primitives are used, they are implemented as operating system (computer systems master program) services that require the process to surrender the computer system to the operating system. The process does a P/Wait when it needs the resource and a V/Signal when it wants to relinquish the resource. Each time a process invokes either a P or a V, it will call the operating system at least once per invocation. This switching to and from the operating system causes P and V primitives to introduce substantial overhead. P invocations indiscriminately cause writer(s) and reader(s) to wait serially for the resource. The P primitive may also affect the behavior of a priority based real-time system. P invocations have a tendency of creating a priority inversion when separate priority queues are not maintained for waiting processes. The absence of priority queues treats all processes as equal activities.

P and V primitives are often based on Lock and Unlock operators. Lock and Unlock operators are often directly based on some computer hardware mechanism. In practice, a successful lock allows a process to access the resource. On the other hand an unsuccessful lock requires the process to re-invoke the lock operator. Many computer systems make Lock and Unlock operators directly available to processes, i.e. they don't require P and V calls, and operating system intervention. Processing of unsuccessful lock(s) is accomplished by having the process either re-invoke the lock until success, or by having it block and continue at some later time, or by having it perform a default action. The re-invoking of the lock is often called a spin-lock and involves busy waiting and hence wastes precious computer system processor cycles. The blocking process as a strategy usually creates the same effect as the P operation, i.e., it serializes access. Unlike the P primitive, the lock operator doesn't have to result in suspended processing, but often default actions are not available when data must be processed.

Submarine combat systems' processing can conceptually be characterized as a processing pipeline with the flow being occasionally broken by human operator actions. Two generic processing structures in submarine combat systems are manifest when this conceptual model is applied. The progression from data to information usually has many processes feeding many other processes as multiple processing stages. The data bases shared to pipe data from one stage to another stage usually have one writer to each data base, or some set of records in it, and several readers accessing the data bases. This processing structure represents the first category, and the focus of the invention. The second category is the other processing structure where the computer system of a submarine combat system operates on data for, presents information to, and assists the actions of its human operators. Many of these actions often result in a break in the combat system processing pipeline. Often access to data bases is necessary, processes acting on the operators behalf may require sole access to either select data bases or sets of data base records. This often requires synchronization with processes in some stage of the processing pipeline. This latter processing scenario requires the P/V and Lock/Unlock solutions.

SUMMARY OF THE INVENTION

Accordingly, it is a general purpose and object of the present invention to provide an improved access of a data base that is subject to being updated at any time. It is a further object that the read portion of the system is aware of this updating if it is reading the data base when the updating occurs. Further objects are that the system be inexpensive, and easy to operate and understand.

These objects are accomplished with the present invention by providing a computer system in which a data base can be updated at any time. A first counter is incremented prior to this updating and a second counter at the completion of the updating. Through comparison of the values of these counters the reading portion of the system is inhibited from commencing to read the data base during an update. In addition the value of these counters informs the read portion of an update of the data base if the reading commenced prior to the update and the update then commenced prior to the completion of the reading.

DESCRIPTION OF THE PREFERRED EMBODIMENT

Computer systems used to prototype and implement various systems must support and execute multiple concurrent processes (programs in execution) in their hardware and software. These computer processes monitor, model, simulate and control world processes and objects.

Each pair of FIGS. 1A and 1B, 2A and 2B, 3A and 3B represent a prior art system. 4A and 4B represents the present invention. The way to interpret these figures is to use two simple rules. Arrows pointing in either the horizontal or the vertical direction represent inexpensive processing of operations among the system components (the operating system (OS) 11, the central processing unit (CPU) 13, the random access memory (RAM) 14, and application programs (AP#)10, 10a, 10b, 10c, 12, 12a, 12b, and 12c). The OS 11, CPU 13, and RAM 14 may or may not be the same in each of the figures depending upon the designers 12b, and 12c). The OS 11, CPU 13, and RAM 14 may or may not be the same in each of the figures depending upon the designers selection of components. The AP#10, 10a, 10b, 10c, 12, 12a, 12b, and 12c all differ from each other. Arrows pointing in the diagonal direction represent expensive processing necessary to carry update notification operations. Diagonal processing requires hundreds of microseconds, while horizontal and vertical processing require a fraction of a micro second. The operating system 11 and application programs 10, 10a, 10b, 10c, 12, 12a, 12b, and 12c can easily exercise the CPU 13 and RAM 14 hardware components. In comparison, it requires many operations for the operating system 11 and application programs 10, 10a, 10b, 10c, 12, 12a, 12b, and 12c to exercise each other. It usually requires that the state/context of programs be saved and that many control modules be invoked in the operating system. In the illustrations the CPU 13 and RAM 14 boxes touch each other, representing the circumstance that these components are closely linked and are often inseparable, e.g., all CPU 13 instructions come from memory and usually operate on memory. The system and its programs 10, 10a, 10b, 10c, 12, 12a, 12b, and 12c exercise the CPU 13 and the RAM 14 constantly, the horizontal and the vertical arrows indicate the components focused on by the operations, versus the details of the operations. The arrows signify the degree or criticality of that system component in accomplishing update notifications. Note that the illustrations implicitly demonstrate a path not explored by the other techniques. To date notification occurred in the diagonal and the horizontal but never in the vertical as occurs in the present invention.

Figures 1A, 1B:
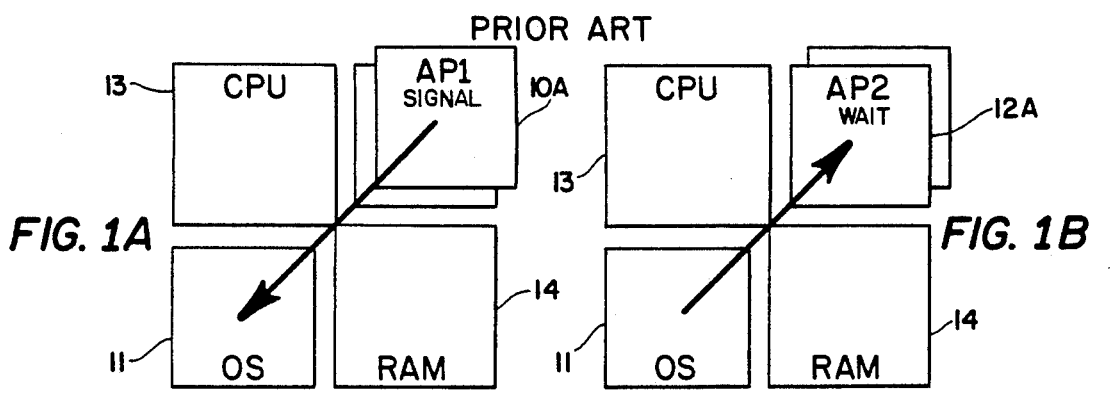
FIG. 1A and 1B represent a first prior art means for the processing of operations among the system components.
Figures 2A, 2B:
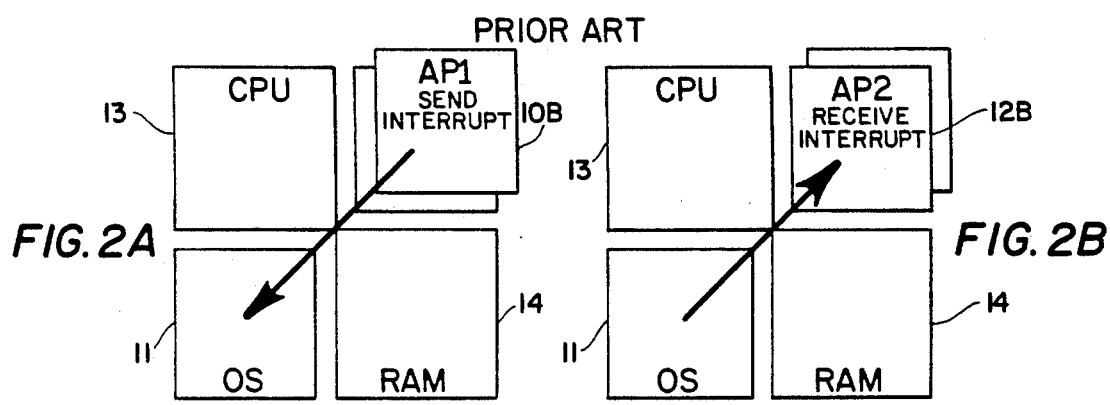
FIG. 2A and 2B represent a second prior art means for the processing of operations among the system components.
Figures 3A, 3B:
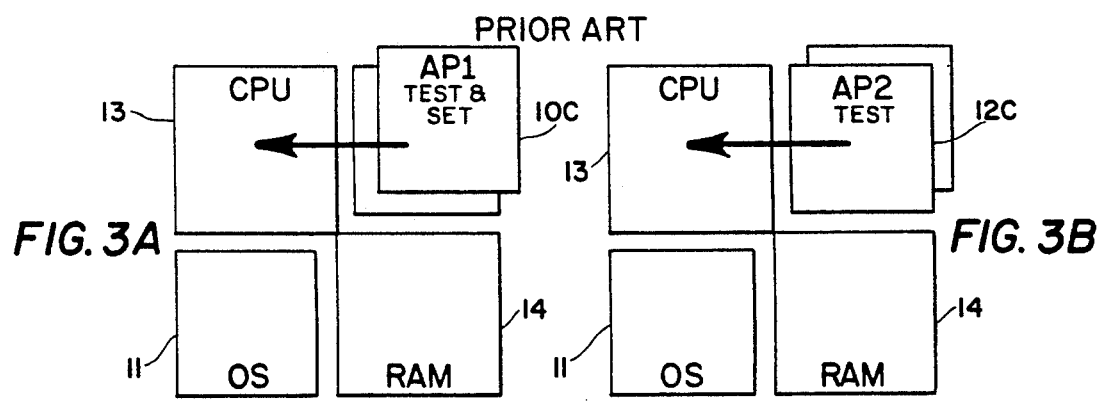
FIG. 3A and 3B represent a third prior art means for the processing of operations among the system components.

FIGS. 1A and 1B show that AP1 10a notifies AP2 12a via OS 11, by using the signal and wait synchronization primitives. FIGS. 2A and 2B show that AP1 10b notifies AP2 12b via OS 11 by sending an interrupt that is handled by AP2's handler. FIGS. 3A and 3B show that AP1 10c notifies AP2 12c via a CPU 13 atomic lock operator (a.k.a. test and set instruction). The above three examples refer to prior art systems.

Figures 4A, 4B:
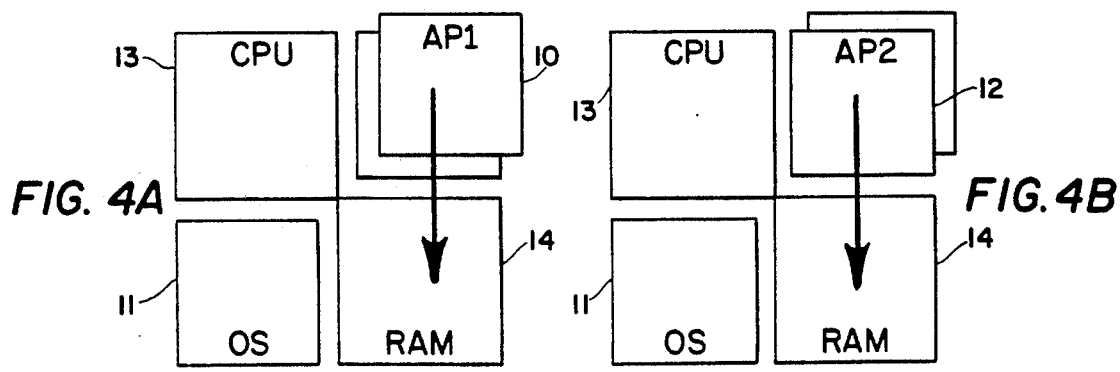
FIG. 4A and 4B represent the present inventive means for the processing of operations among the system components.

FIGS. 4A and 4B show the present invention in which AP1 10 notifies AP2 12 via RAM 14 based counters/registers (a.k.a. variables).

Figure 5:
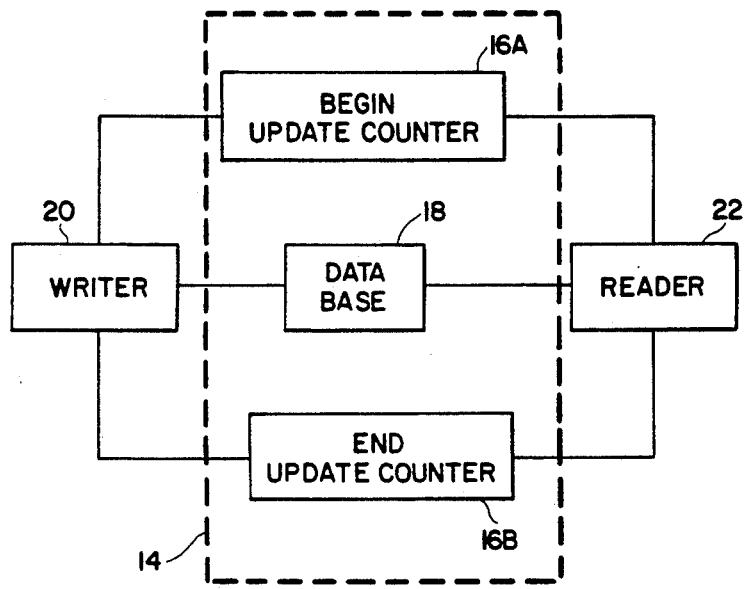
FIG. 5 is a block diagram of a synchronization system in accordance with the present invention as represented in FIGS. 4A and 4B.

For a further description of the present invention refer now to FIG. 5 where there is shown a pair of counters 16a and 16b. The counter 16a is designated as begin-update-counter and counter 16b is designated as end-update-counter. The counters 16a and 16b along with data base 18 are located in RAM 14. Both counters 16a and 16b are associated with a writer 20. The writer 20 is connected to modify the data base 18 and increment each of the counters 16a and 16b. A reader 22 is also connected to read the value of both counters 16a and 16b, and to read data base 18.

Figure 6:
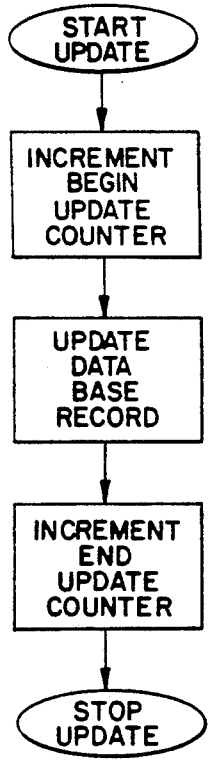
FIG. 6 is a flow diagram of the updating of the data base in the synchronization system of FIG. 5.
Figure 7:
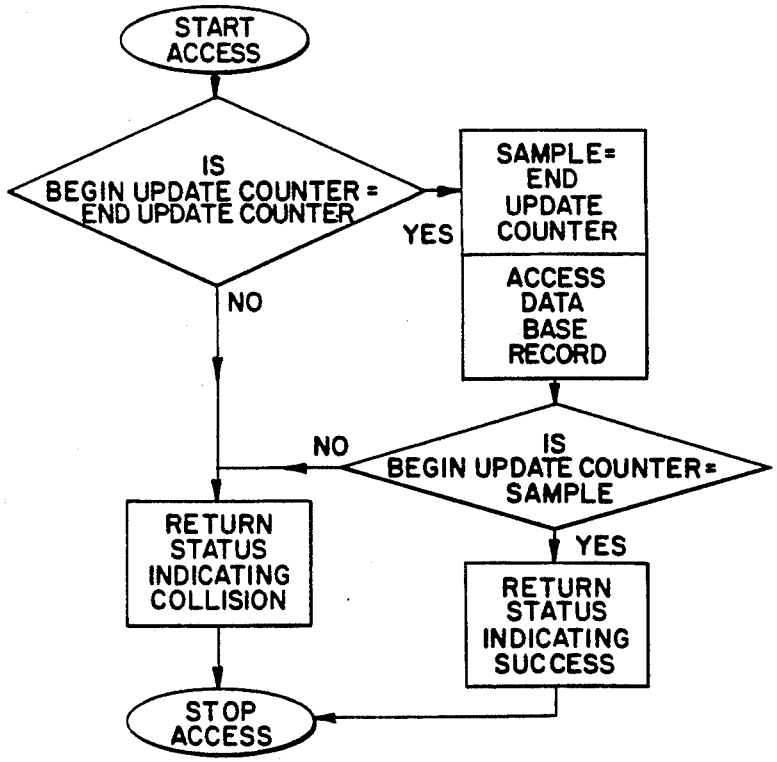
FIG. 7 is a flow diagram of the reading of the data base in the synchronization system of FIG. 6.

FIG. 6 is flow diagram representation for the operation of the writer 20. FIG. 7 is a flow diagram representation for the operation of the reader 22. While only one reader 22 and its operation sequence is shown in the drawings, it is to be understood multiple readers 22 with associated identical operational sequences could be used. In addition, multiple data bases 18 could be used.

Referring to FIG. 6 it is shown that prior to the data base being updated by the writer 20, the begin-update-counter 16a is incremented making it read one numeral higher than the end-update-counter 16b. The data base 18 is then updated by the writer 20. Following this the end-update-counter 16b is incremented making it read the numerical equal of the begin-update-counter 16a. The updating procedure is then complete.

Referring to FIG. 7 the flow diagram shows that prior to reader 22 accessing the data base 18 a comparison of the begin-update-counter 16a and the end-update-counter 16b is made. If the numerical readings on the two counters 16a and 16b are not equal a collision is indicated and the process is stopped. This collision indicates that the data base 18 is being updated by the writer 20 at the time the reader 22 wants to access the data base 18. If on the other hand the numerical readings on the two counters 16a and 16b are equal then a sample of the value on the end-update-counter 16b is taken and the reader 22 accesses the data base 18. This equality of readings on the two counters 16a and 16b indicates that the data base 18 is not being updated by the writer 20 at the time the reader 22 wants to access the data base 18. In the present embodiment the value of the end-update-counter 16b is taken as the sample. Following access of the data base 18 by the reader 22 the numerical reading on the begin update-counter 16a is compared to the sample value taken. If the reading of the counter 16a is unequal to the sample value a collision is indicated that shows the data base 18 was accessed by the writer 20 during the time the reader 22 was accessing the data base 18. If on the other hand the begin-update-counter 16a is equal to the sample value taken then the access by the reader 22 was successful.

There has therefore been described a means of providing synchronization between a writer 20 and one or more readers 22 by using two counters 16a and 16b. An advantage is that the writer 20 is never inhibited from updating the data base record, i.e., the writer 20 never has to queue for the data base 18. Operating system intervention is only required after a collision. The absence of intervention reduces overhead substantially. Collisions can be processed by requesting the operating system to queue the process for the processor at priority, thus eliminating the possible priority inversion caused by the P primitive.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of providing synchronization in data structures, by use of a computer, comprising the steps of:

incrementing a first counter within RAM by means of a first application process;

updating at least one data base record within RAM by means of said first application process;

incrementing a second counter within RAM by means of said first application process after completion of updating of said at least one data base record within RAM;

comparing the values of said first and second counters within RAM for equality by means of a second application process;

defering further processing of said second application process if values of said first and second counters within RAM differ;

sampling and retaining by means of said second application process the value within RAM of one of said first and second counters within RAM if said first and second counters have equal values;

accessing by means of said second application process at least one data base record within RAM if said first and second counters within RAM have equal values;

comparing by means of said second application process the said retained value within RAM and the value of the said first counter within RAM following the completion of accessing said at least one data base record within RAM; and indicating by means of said second application process indicate if the value of said retained value within RAM and said first counter within RAM are equal.

2. A method of providing synchronization in data structures according to claim 1 further comprising a writer being used to achieve the step of updating at least one data base record within RAM.

3. A method of providing synchronization in data structures according to claim 2 further comprising at least one reader being used to achieve the step of accessing at least one data base record within RAM if said first and second counters within RAM have equal values.

* * * * *